(12) United States Patent
Schmieder et al.

(10) Patent No.: US 8,259,401 B2
(45) Date of Patent: Sep. 4, 2012

(54) CASTELLATED OPTICAL MOUNTING STRUCTURE

(75) Inventors: James A. Schmieder, Wayland, NY (US); Paul D. Ludington, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1514 days.

(21) Appl. No.: 10/993,056

(22) Filed: Nov. 19, 2004

(65) Prior Publication Data
US 2006/0109668 A1    May 25, 2006

(51) Int. Cl.
*G02B 7/02* (2006.01)
(52) U.S. Cl. .................. 359/819; 359/811; 359/827
(58) Field of Classification Search .......... 359/811, 359/819, 818, 808, 823–830
See application file for complete search history.

(56) References Cited

U.S. PATENT DOCUMENTS

| | | | |
|---|---|---|---|
| 4,258,982 A | | 3/1981 | Skinner et al. |
| 4,281,895 A | * | 8/1981 | Mohr ............................ 359/827 |
| 4,854,671 A | | 8/1989 | Hanke et al. |
| 5,249,082 A | * | 9/1993 | Newman ........................ 359/813 |
| 5,493,452 A | * | 2/1996 | Hoshino et al. ............... 359/819 |
| 5,642,235 A | | 6/1997 | Ichikawa |
| 6,108,146 A | | 8/2000 | Kenin et al. |
| 6,400,516 B1 | | 6/2002 | Spinali |
| 6,714,366 B2 | | 3/2004 | Wisecarver et al. |
| 7,244,026 B1 | * | 7/2007 | Ross et al. ..................... 351/219 |
| 7,255,452 B2 | * | 8/2007 | Schmidt ........................ 359/871 |
| 7,268,958 B2 | * | 9/2007 | Hatakeyama et al. ......... 359/811 |
| 2002/0184919 A1 | * | 12/2002 | Otsuki et al. ....................... 65/39 |
| 2003/0043728 A1 | * | 3/2003 | Kan et al. ...................... 369/244 |

FOREIGN PATENT DOCUMENTS

| | | |
|---|---|---|
| EP | 1 338 911 | 8/2003 |
| EP | 1 429 168 | 6/2004 |
| JP | 63-131110 | 6/1988 |
| JP | 2004-226804 | 8/2004 |
| WO | WO 2005/101082 | 10/2005 |

* cited by examiner

*Primary Examiner* — Mohammed Hasan
(74) *Attorney, Agent, or Firm* — William R. Zimmerli; Justin D. Petruzzelli

(57) ABSTRACT

An optical assembly has a lens element having a plurality of radially extending tabs and a mounting structure having a plurality of retaining members. The retaining members extend in a direction substantially parallel to an optical axis defined by the mounting structure and are positioned complementary to the radially extending tabs of the lens element. A portion of the mounting structure is in an interference fit with the a portion of the lens element.

35 Claims, 8 Drawing Sheets

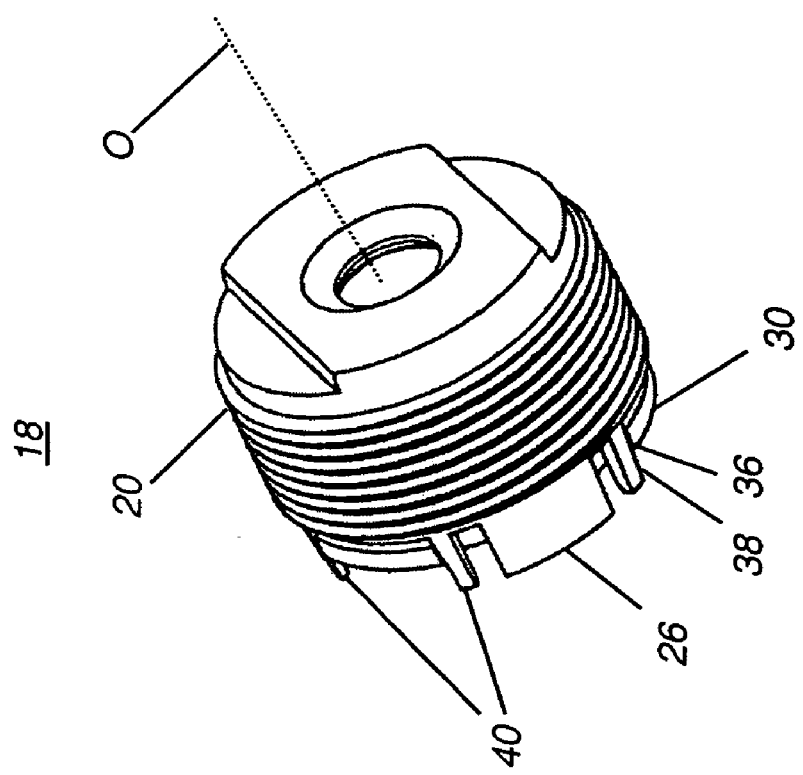
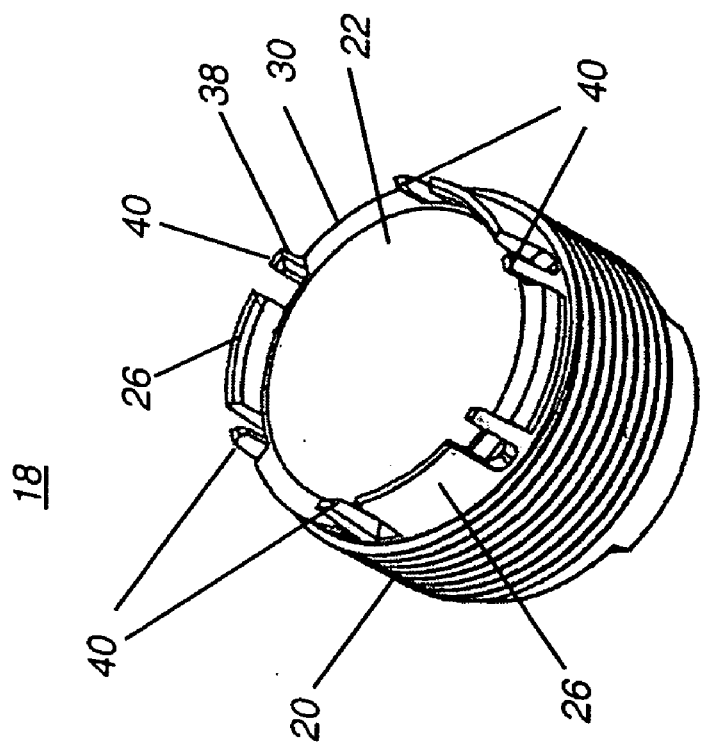
FIG. 5B
FIG. 5A

CASTELLATED OPTICAL MOUNTING STRUCTURE

FIELD OF THE INVENTION

The invention relates generally to optical component mounting and more particularly relates to a barrel mounting apparatus for a lens.

BACKGROUND OF THE INVENTION

The growth of portable, personal electronics devices such as cellphones, PDAs, and similar devices, has spurred development of miniaturized cameras and light-sensing components that can be incorporated into these devices. The continuing demand for smaller and more powerful imaging apparatus, coupled with the requirement for low cost, presents a considerable challenge to optical and mechanical design. Low-cost lens assemblies, typically including a number of plastic lens elements, are being used increasingly for these applications. As lenses become smaller, however, there are a number of practical considerations that are of comparatively little concern for design of larger optical systems.

Although very small plastic lenses can be fabricated inexpensively at high volumes, the handling, alignment, and mounting of these tiny optical components into a lens assembly using multiple components poses significant problems. A number of conventional approaches have been applied to the problem of plastic lens mounting, alignment and centration of lenses, including the use of features formed within a lens barrel or other supporting structure. Kinematic component mounting techniques, such as those disclosed in U.S. Pat. No. 6,400,516 entitled "Kinematic Optical Mounting" to Spinali take advantage of ease of fabrication to provide additional structures outside the optical area of the lens, such as radial tabs or other protrusions. Various types of fasteners, clamps, springs, fittings, or adhesives have been employed to mount these miniaturized optical components. However, as is exemplified in the Spinali '516 disclosure, some approaches may prove to be too complex for low-cost, miniaturized optical systems. Even adhesives require some surface area for their application, which can reduce the effective diameter of a barrel structure, for example.

It is known to provide tabs or other peripheral mounting and handling structures on optical components. However, many applications using tab structures are inappropriate for small scale lens assemblies, particularly for plastic lens elements. For example, U.S. Pat. No. 4,854,671 entitled "Mount for Optical Elements" to Hanke et al. discloses a lens assembly in which elastic ribs are applied to form tabs on the lens perifery, then are compressed to hold the lens in place. Notably, however, the elastic tabs are of a different material from the lens.

Other approaches to the lens mounting problem combine tabs or protrusions on the lens with features built into a lens mount, holder, or barrel. For example, commonly assigned U.S. Pat. No. 5,249,082 entitled "Exact Constraint Arrangement for and Methods of Mounting an Element Such as a Lens" to Newman discloses a lens holder that provides a three-pin engagement for radially extended tabs on a lens element. Similarly, U.S. Pat. No. 5,642,235 entitled "Lens Supporting Device" to Ichikawa show the use of various tab mating features in a lens supporting sleeve.

Still other approaches for lens mounting take advantage of the conformability of resilient plastic materials used as lens barrels or mounting rings. For example, U.S. Pat. No. 6,714,366 entitled "Optical Component Mounting Apparatus" to Wisecarver et al. discloses the use of a flexible sidewall for mounting a lens within a lens mounting sleeve.

Referring to FIG. 1, another conventional solution in a lens mount assembly 10 uses a retaining ring 12 for holding a lens element 14 in place within a barrel 16. Adhesive is then used to hold retaining ring 12 in place once it is properly positioned. Retaining structures such as retaining ring 12 are advantaged for temporarily positioning lens element 14 until adhesive has fully cured. Other methods may not use any type of retaining structure, gluing lens element 14 directly to barrel 16.

Such conventional solutions for plastic lens mounting typically place an undesirable constraint on lens size. For many applications, such as when used in the portable electronic devices noted earlier, lenses must provide maximum light throughput with a clear aperture as large as possible. Constraining the lens area within a surrounding structure such as shown in FIG. 1 and as described in the '082 Newman and '235 Ichikawa disclosures, can effectively reduce the effective or clear aperture of the lens that can be used and limits the light throughput. Certainly, increasing the size of a lens mounting or barrel OD is a possible solution; however, in the miniaturized applications of interest, increasing the dimensions of mounting components is not an available option.

Thus, it can be seen that there is a need for a lens mounting arrangement that maximizes the clear aperture of the lens when using a barrel- or sleeve-mounted lens element, that minimizes the outer diameter (OD) of the lens barrel or other mounting structure, and that can be provided at relatively low cost.

SUMMARY OF THE INVENTION

It is an object of the present invention to provide an optical assembly comprising:

a lens element having a plurality of radially extending tabs; and a mounting structure having a plurality of retaining members, the retaining members extending in a direction substantially parallel to an optical axis defined by the mounting structure and positioned complementary to the radially extending tabs of the lens element, wherein a portion of the mounting structure is in an interference fit with the a portion of the lens element.

BRIEF DESCRIPTION OF THE DRAWINGS

In the detailed description of the preferred embodiments of the invention presented below, reference is made to the accompanying drawings, in which:

FIGS. 5A and 5B are perspective views from sensor side and object side, respectively, of a lens assembly according to another embodiment of the present invention;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
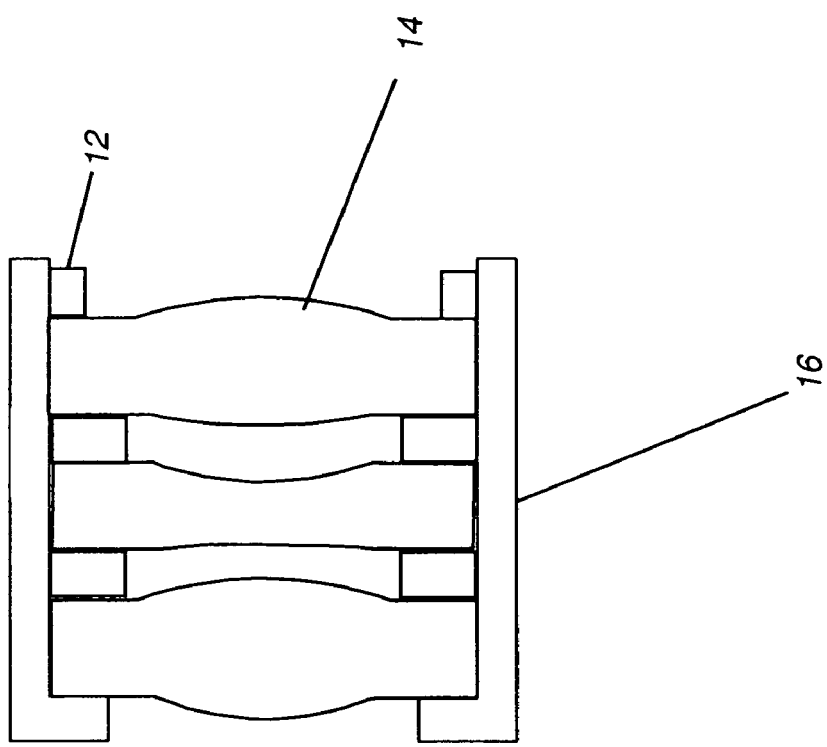
FIG. 1 is a side view in cross-section of a lens assembly using a retaining ring in a conventional embodiment.
Figure 2A:
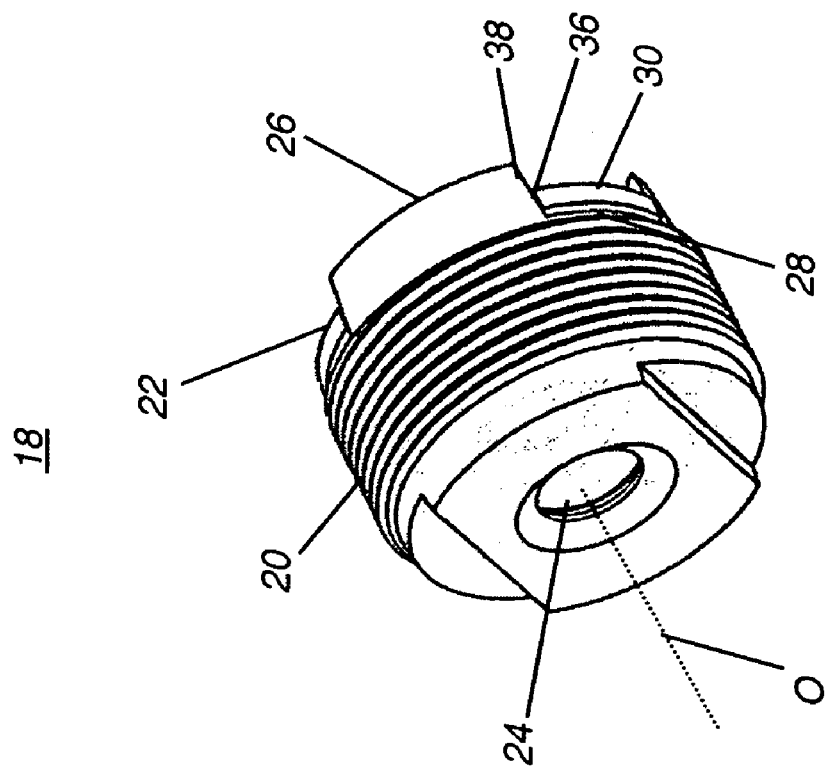
FIGS. 2A and 2B are perspective views from sensor side and object side, respectively, of a lens assembly according to one embodiment of the present invention.
Figure 2B:
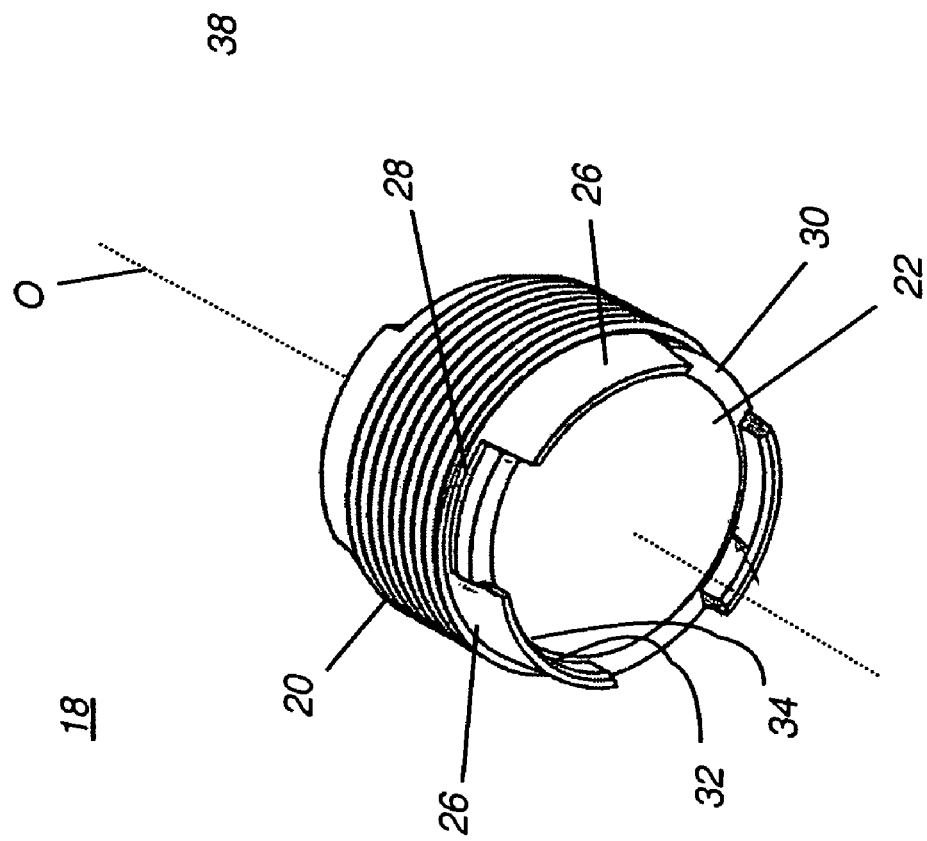
Figure 3:
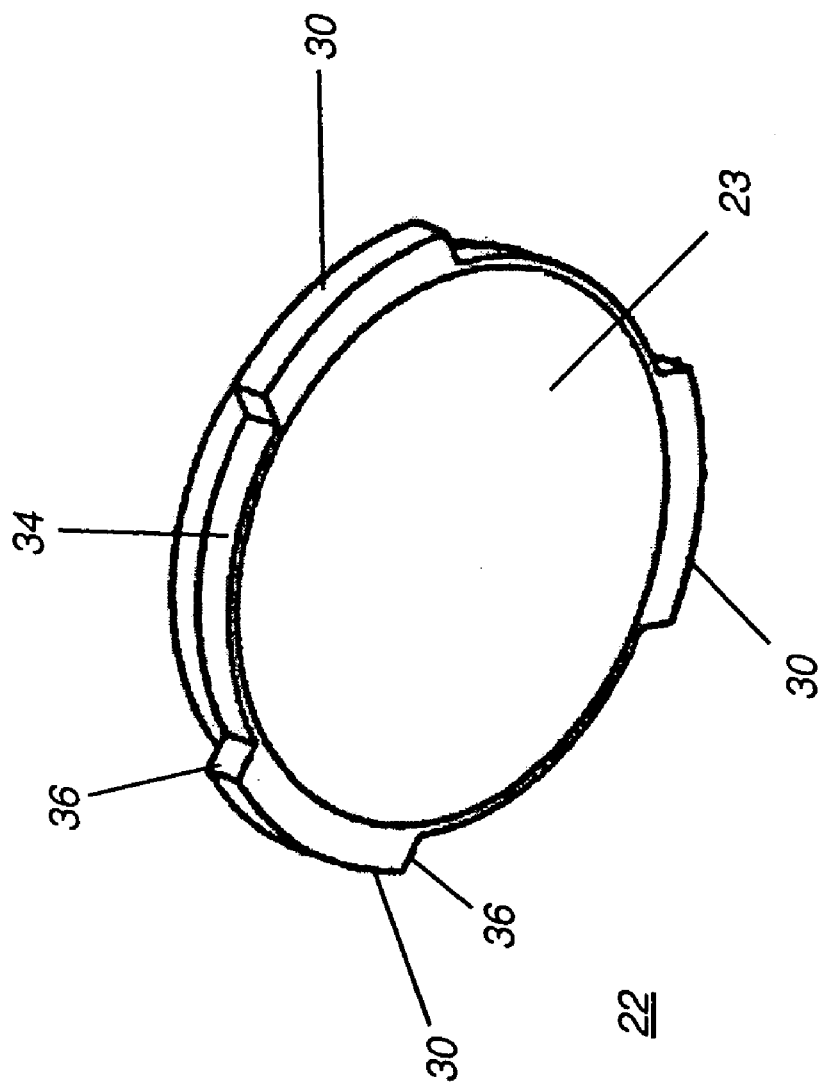
FIG. 3 is a perspective view of a lens configured according to one embodiment of the present invention.
Figure 4B:
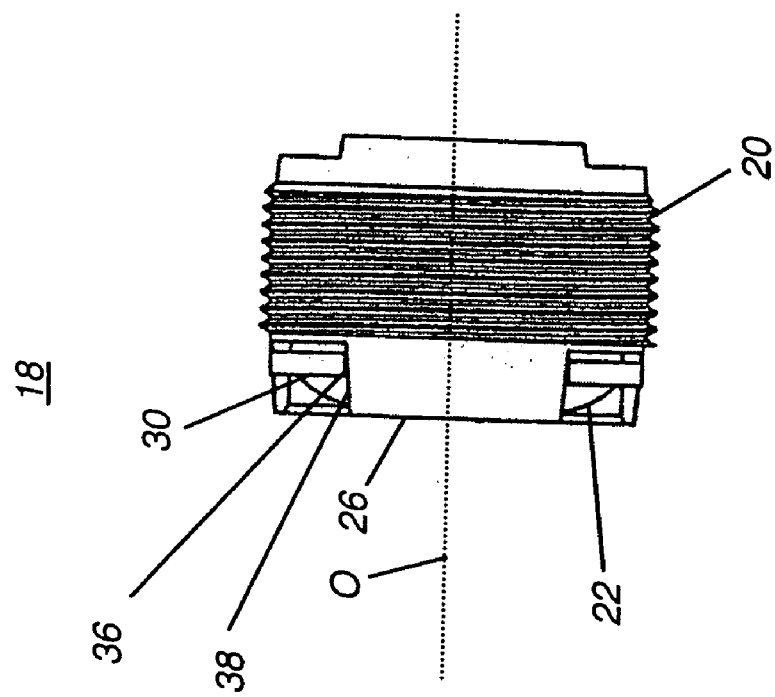
FIGS. 4A and 4B are side views of a lens assembly according to the present invention, at different rotations about the optical axis.
Figure 4A:
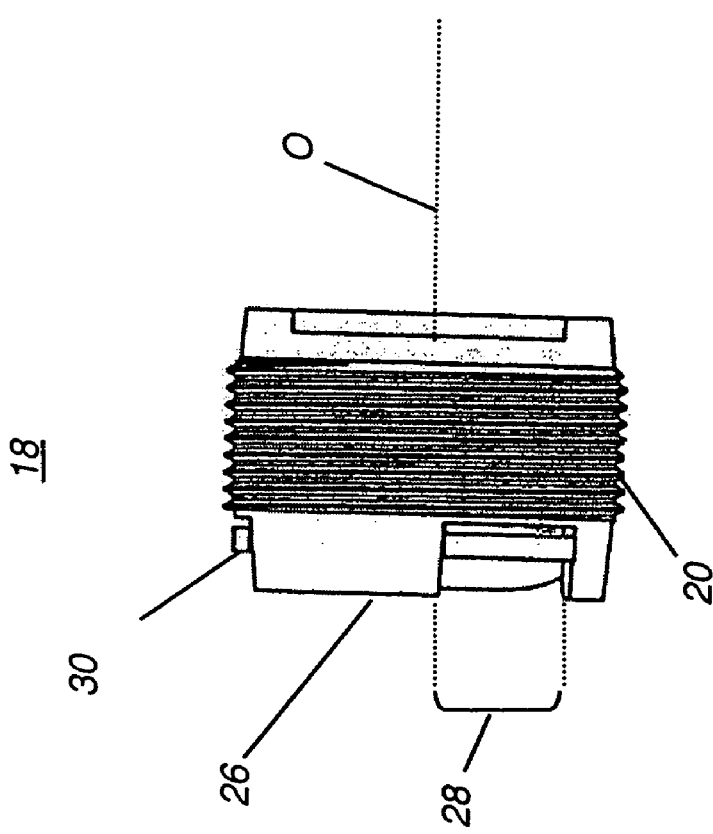
Figure 6B:
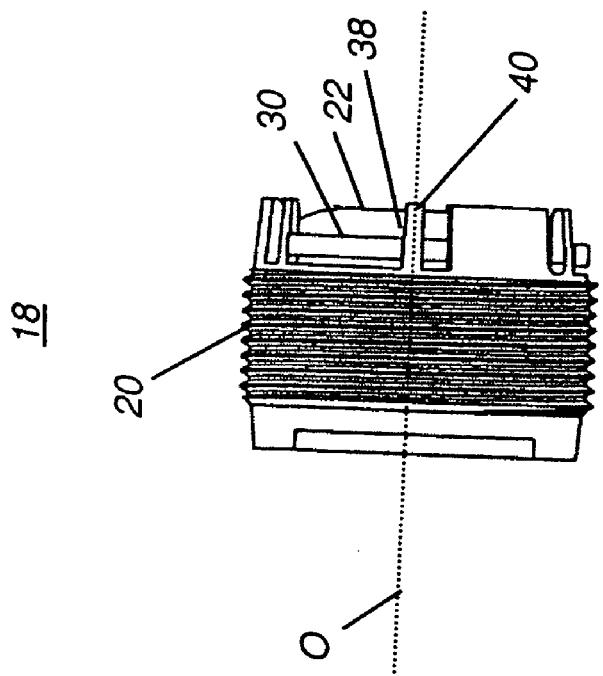
FIGS. 6A and 6B are side views of a lens assembly according to the present invention, at different rotations about the optical axis.
Figure 6A:
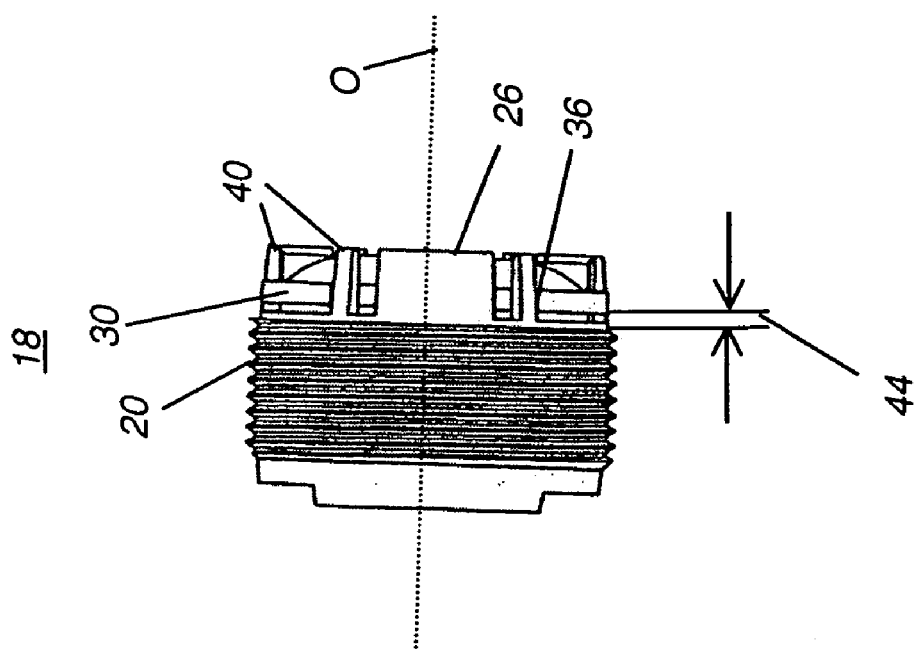

Referring to FIGS. 2A and 2B, there are shown perspective views of a lens assembly 18 with a lens barrel 20 that serves as an optical mounting structure in one embodiment for mounting optical components along an optical axis O. FIGS. 4A and 4B show side views of lens assembly 18. A lens element 22 is mounted in lens barrel 20 as an outer lens in this optical assembly, for facing a sensor circuit, for example. A second lens 24 is configured to face the object being imaged or light source, for example. Lens barrel 20 is castellated, having one or more elongated portions 26 separated by gaps 28, best shown in FIG. 4A. Elongated portions 26 extend in a direction that is generally parallel to optical axis O. Lens element 22, a generally axisymmetric lens in the embodiment shown, has a clear aperture 23 for directing incident light and one or more radially extending tabs 30, shown more clearly in the perspective view of FIG. 3. Tabs 30 of lens element 22 and elongated portions 26 of barrel 20 are positioned in a complementary relationship, to enable seating lens element 22 against lens barrel 20 without requiring that the full circumference of lens element 22 be encased by the sides of barrel 20. With this arrangement, it can be appreciated that clear aperture 23 of lens element 22 is maximized, even though lens element 22 is fitted in place in barrel 20. In this embodiment, elongated portions 26 act as a type of retaining member for holding lens element 22 in place.

In lens assembly 18, an interference fit for lens element 22 within barrel 20 or other mounting structure can be provided in a number of ways. One type of interference fit can be effected between lens element 22 and elongated portions 26. Here, an inner surface 32 of elongated portion 26 (FIG. 2A) provides an interference fit against an outer surface 34 of lens element 22. As shown best in FIG. 3, outer surface 34 is an area of lens element 22 between tabs 30.

An alternate type of interference fit can be obtained at the flat interface of a side flat surface 36 of tab 30 with a side flat surface 38 of elongated portion 26. This interference fit option may be preferable in many applications, since pressure due to the flat fit itself can be applied to tab 30 rather than to the light-handling portion of lens element 22. As yet another alternative, both types of interference fit could be provided, using interference fits against both tab(s) 30 and outer surface 34 of lens element 22.

An alternate embodiment of lens assembly 18, shown in FIGS. 5A, 5B, 6A, 6B, 7A, 7B, and 7C, provides lens barrel 20 or other suitable mounting structure with an arrangement of fingers 40 that can act as retaining members to supplement or replace elongated portions 26 in FIGS. 2A, 2B, 4A, and 4B. The use of fingers 40 may be advantageous where the interference fit is against tabs 30, for example, since these narrow extended elements would have more flexibility over elongated portions 26. Combinations using both fingers 40 and elongated portions 26 would be advantageous where there are interference fits against both tabs 30 and outer surface 34. Other combinations using only fingers 40 extending from barrel 20 could be envisioned, along with embodiments using one or more fingers 40 that are of a more circumferentially elongated shape, even approaching the shape of elongated portions 26.

Figure 7C:
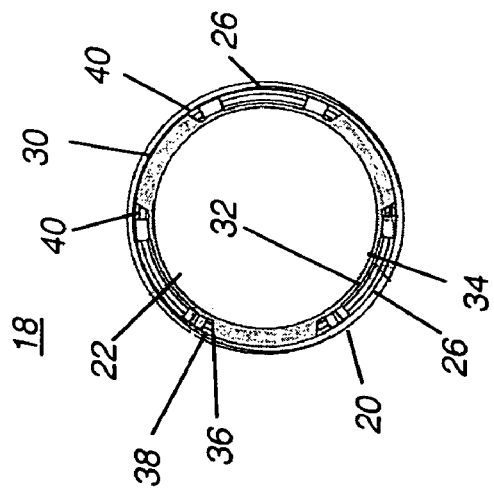
FIG. 7A is a front plan view of a lens assembly according to the present invention.
FIG. 7B is a side view in cross section of a lens assembly according to the present invention; and, FIG. 7C is a rear (sensor side) plan view of the lens assembly of FIG. 7B.
Figure 7A:
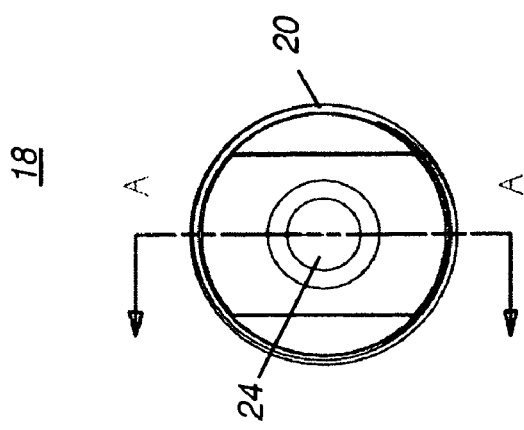
Figure 7B:
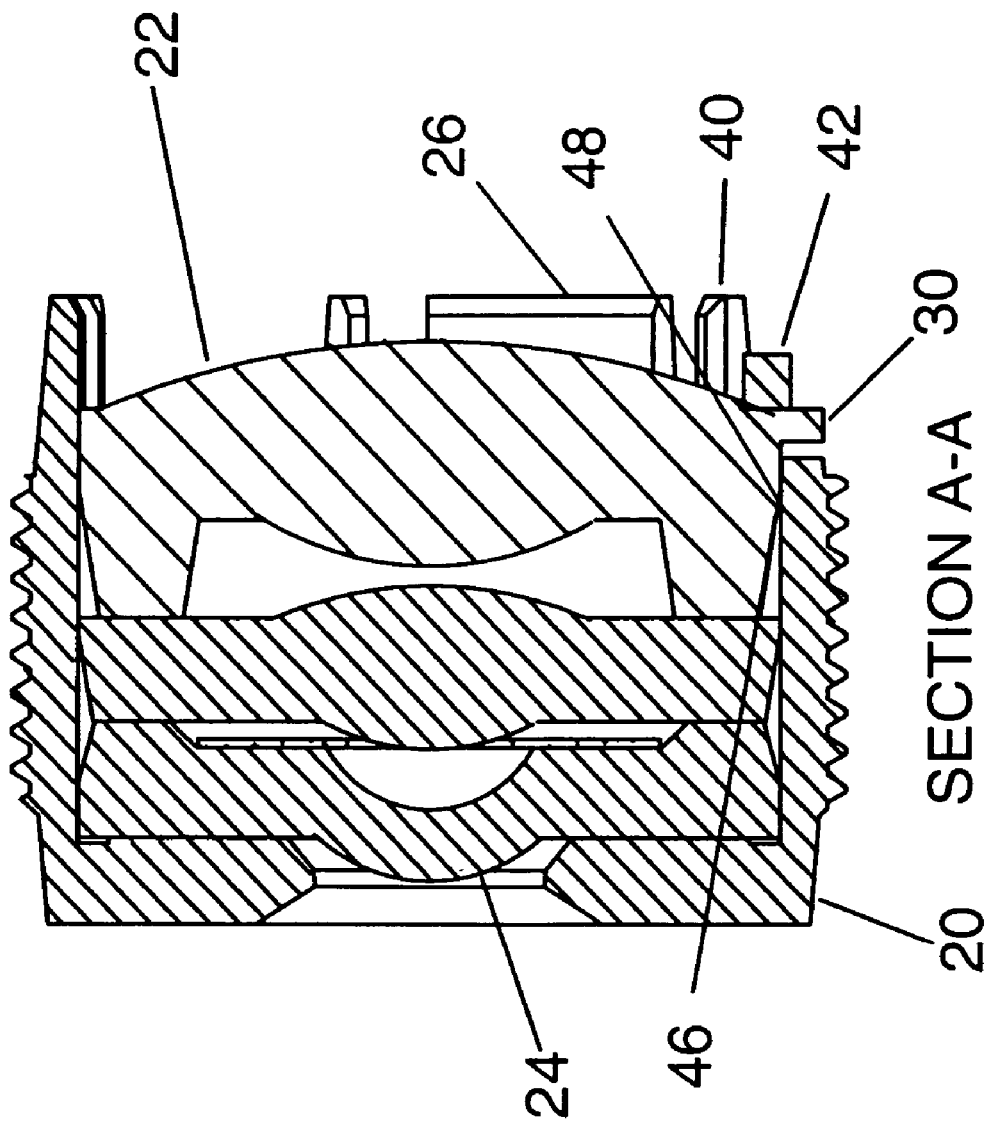

Yet another type of interference fit is shown in FIG. 7B that shows an edge portion of lens element 22 as fitted into barrel 20. Here, a side edge 46 of lens element 22 seats with an interference fit against an inner surface 48 of barrel 20. For this alternate embodiment, tab 30 plays a passive role in providing the interference fit itself, allowing handling of lens element 22 without touching clear aperture 23. As shown in FIG. 7B and applicable to each of the possible interference fit embodiments, an adhesive 42 can be applied to tab 30 and its adjacent finger 40 or extended member 26, as appropriate.

With each of the interference fit embodiments shown, the interference fit itself is provided by some combination of opposing force between lens element 22 (possibly including tabs 30) and the castellated sidewalls or the inner surface 48 of barrel 20 or other mounting structure that provides elongated portions 26 or fingers 40 as retaining members. It can be appreciated that the location and amount of retaining force in the interference fit must be adapted to the needs of a particular application, including consideration of the amount of force that can be tolerated by optical and mechanical components.

As in most optical assembly applications, over-constraint conditions must generally be avoided. For example, referring to FIG. 6A, a gap 44 in the direction of optical axis O is maintained between lens element tabs 30 and barrel 20. Gap 44 allows proper longitudinal spacing of lens element 22 within lens assembly 18. Optical alignment of lens element 22 relative to optical axis O defined by lens barrel 20 is also provided using the interference fit.

In some embodiments, lens assembly 18 may not require further mechanical or glued assembly operations in order to provide a usable lens assembly. However, in most embodiments, additional assembly steps must be carried out once lens element 22 is positioned in place, in order to reliably secure lens element 22 in position. As was shown in FIG. 7B, adhesive 42 is applied at one or more tabs 30 in the embodiments described herein, thereby bonding lens element 22 to barrel 20 once lens element 22 is properly seated in position. Curing processes such as UV curing may be used for adhesive bonding. Other methods for fixing lens element 22 into position could include the use of any of the various types of welding processes, including laser welding, sonic welding, and bonding produced using heat-induced sealing. Heat-induced sealing processes may be used, including processes that deliberately melt and deform a portion of the mounting structure in order to hold lens element 22 in place, for example. Still other methods for fixing lens element 22 in place could employ various types of fastening hardware, including components that cooperate with threads or other features on barrel 20.

In another embodiment, lens element tabs 30 can be used simply for handling and parts guidance during assembly, without the need for an interference fit. For this type of embodiment, lens element tabs 30 are used to handle lens element 22 and to help guide lens element 22 into position in barrel 20. Tabs 30 fit into the corresponding gaps 28 that lie between elongated portions 26, without achieving an interference fit against either tabs 30 or outer surface 34 of lens element 22. Sufficient force must be applied against lens element tabs 30 in order to ensure that lens element 22 is properly seated in barrel 20. While such force is being applied to the lens element tabs 30, an appropriate bonding technique can then be used to more permanently fix lens element 22 into barrel 20, such as using adhesives, welds, heat, or mechanical fasteners as outlined hereinabove. Advantageously, not only the handling operations for maneuvering lens element 22, but also the fixing operation for more permanently bonding lens element 22 into place can be done without the need for contact along clear aperture 23.

The method of the present invention can be used with optical elements in a range of sizes, and is particularly well-suited for use with small lenses, where it is important to maximize the usable clear aperture, as noted in the background section above. Lens element 22 can be glass, plastic, or other suitable material. Lens element 22 may have elastic properties. Similarly, barrel 20, a sleeve, ring, or other mounting structure may be of a flexible or elastic material and may be metal, ceramic, plastic, or some type of composite material, for example, as needed by the application.

It is an advantage of the present invention that it provides an apparatus and method for lens mounting that is relatively low cost, can be readily adapted to small lens assemblies, and is suitable for use with other techniques for lens mounting, including permanent bonding. The method of the present invention allows lens element 22 to be positioned within a suitable mounting structure without touching clear aperture 23. This method helps to optimize clear aperture 23, eliminating the need for a retaining component and allowing adhesive to be applied without obstruction to clear aperture 23.

The invention has been described in detail with particular reference to certain preferred embodiments thereof, but it will be understood that variations and modifications can be effected within the spirit and scope of the invention. For example, the present invention can be used with various types of optical elements. The present invention can be used with axisymmetric lenses, such as lens element 22 is shown in the figures. In an axisymmetric lens, optical power within the clear aperture is symmetric about an optical axis. Axisymmetric lenses may be spherical or aspherical in shape. The present invention could also be used for anamorphic lenses, such as cylindrical or toroidal lenses, for example. Unlike the axisymmetric lens, an anamorphic lens provides different optical power for incident light along different orthogonal axes. Either or both lens surfaces could alternately be plano surfaces.

The arrangement using three evenly spaced tabs 30 is advantageous for providing stable support; however, a different number of tabs 30 or different tab spacing could be used. For an anamorphic lens, for example, it may be advantageous to adjust the tab spacing to effect proper orientation of the lens in assembly.

Thus, it can be seen that the apparatus and method of the present invention provide an optical mounting structure suitable for mounting a lens element and advantaged in maximizing the clear aperture.

PARTS LIST

10. Lens mount assembly
12. Retaining ring
14. Lens element
16. Barrel
18. Lens assembly
20. Barrel
22. Lens element
23. Clear aperture
24. Lens
26. Elongated portion
28. Gap
30. Tab
32. Inner surface
34. Outer surface
36. Side surface
38. Side surface
40. Finger
42. Adhesive
44. Gap
46. Side edge
48. Inner surface

The invention claimed is:

1. An optical assembly comprising:
   a lens element having a plurality of radially extending tabs; and
   a mounting structure having a plurality of retaining members, the retaining members extending in a direction substantially parallel to an optical axis defined by the mounting structure and positioned complementary to the radially extending tabs of the lens element, wherein a portion of the mounting structure is in at least one non-bonding opposing-force pressure interference fit with a portion of the lens element so that the respective portions forcibly press against each other to use pressure to hold the lens element in place relative to the mounting structure.

2. The assembly of claim 1, each of the retaining members having an inner curved surface and the lens element having an outer curved surface, wherein the interference fit includes the inner curved surface of at least one of the retaining members being radially in opposing-force pressure interference curved contact with the outer curved surface of the lens element, and each of the retaining members having a side flat surface and each of the radially extending tabs having a side flat surface, wherein the interference fit includes the side flat surface of at least one of the retaining members being in opposing force interference non-curved contact with the side flat surface of at least one of the radially extending tabs.

3. The assembly of claim 2, each of the retaining members having a second side flat surface and each of the radially extending tabs having a second side flat surface, wherein the interference fit includes the second side flat surface of at least one of the retaining members being in opposing force interference non-curved contact with the second flat side surface of at least one of the radially extending tabs.

4. The assembly of claim 1, wherein each of the retaining members are made from a material having an elastic property.

5. The assembly of claim 1, wherein the lens element is made from a plastic material.

6. The assembly of claim 1, wherein the lens element is made from a glass material.

7. The assembly of claim 1, wherein at least one retaining member comprises at least one finger longitudinally extending in a direction substantially parallel to the optical axis defined by the mounting structure.

8. The assembly of claim 1, wherein at least one retaining member comprises at least one elongated portion extending in a direction substantially parallel to the optical axis defined by the mounting structure.

9. The assembly of claim 1, wherein at least one retaining members comprises at least one finger longitudinally extending in a direction substantially parallel to the optical axis defined by the mounting structure and at least one elongated portion extending in a direction substantially parallel to the optical axis defined by the mounting structure.

10. The assembly of claim 1, the mounting structure having a body, wherein a gap exists between the plurality of extending tabs and the body of the mounting structure.

11. The assembly of claim 1, wherein the lens element comprises axi-symmetric lens power.

12. The assembly of claim 1, wherein the lens element comprises anamorphic lens power.

13. The assembly of claim 1, wherein the lens element comprises an aspherical lens surface.

14. The assembly of claim 1, wherein the lens element comprises a spherical lens surface.

15. The assembly of claim 1, wherein the lens element comprises a plano lens surface.

16. A method of manufacturing an optical system comprising:
providing a lens element having a plurality of radially extending tabs;
providing a mounting structure having a plurality of retaining members, the retaining members extending in a direction substantially parallel to an optical axis defined by the mounting structure and positioned complementary to the radially extending tabs of the lens element; and
fixing the lens element to the mounting structure at least temporarily by providing at least one non-bonding opposing-force pressure interference fit between a portion of the mounting structure and a portion of the lens element so that the respective portions forcibly press against each other to use pressure to hold the lens element in place relative to the mounting structure.

17. The method of claim 16, further comprising:
causing the at least temporary fixing of the lens element to the mounting structure to become more permanent.

18. The method of claim 17, wherein causing the at least temporary fixing of the lens element to the mounting structure to become more permanent comprises applying an adhesive to the lens element and the mounting structure.

19. The method of claim 18, further comprising:
applying the adhesive to at least one of the radially extending tabs of the lens element and at least one of the retaining members of the mounting structure.

20. The method of claim 17, wherein causing the at least temporary fixing of the lens element and the mounting structure to become more permanent comprises welding the lens element and the mounting structure together.

21. The method of claim 20, wherein the welding process is a laser welding process.

22. The method of claim 20, wherein the welding process is a sonic welding process.

23. The method of claim 17, wherein causing the at least temporary fixing of the lens element to the mounting structure to become more permanent comprises using a heat induced sealing process.

24. The method of claim 23, wherein the heat induced sealing process comprises applying heat to a portion of the mounting structure and deforming the portion of the mounting structure.

25. The method of claim 16, each of the retaining members having an inner curved surface and the lens element having an outer curved surface, wherein providing the interference fit between the portion of the mounting structure and the portion of the lens element includes providing opposing-force pressure interference curved contact radially between the inner curved surface of at least one of the retaining members and the outer curved surface of the lens element, and each of the retaining members having a side flat surface and each of the radially extending tabs having a side flat surface, wherein providing the interference fit between the portion of the mounting structure and the portion of the lens element includes providing opposing force interference non-curved contact between the side flat surface of at least one of the retaining members and the side flat surface of at least one of the radially extending tabs.

26. The method of claim 25, each of the retaining members having a second side flat surface and each of the radially extending tabs having a second side flat surface, wherein providing the interference fit between the portion of the mounting structure and the portion of the lens element includes providing opposing force interference non-curved contact between the second side flat surface of at least one of the retaining members and the second side flat surface of at least one of the radially extending tabs.

27. The method of claim 16, the mounting structure having a barrel portion, the barrel portion having an axis, the lens element having an axis, wherein providing the interference fit between the portion of the mounting structure and the portion of the lens element aligns the axis of the lens element with the axis of the barrel portion of the mounting structure.

28. An optical assembly comprising:
a lens element having a plurality of radially extending tabs;
a mounting structure having a plurality of retaining members, the retaining members extending in a direction substantially parallel to an optical axis defined by the mounting structure and positioned complementary to the radially extending tabs of the lens element; and
means for fixing the lens element to the mounting structure at least temporarily by creating at least one non-bonding opposing-force pressure interference fit between respective portions of the lens element and the mounting structure so that the respective portions forcibly press against each other to use pressure to hold the lens element in place relative to the mounting structure.

29. The assembly of claim 28, wherein the means for fixing the lens element to the mounting structure comprises an opposing force interference contact between a portion of the lens element and a portion of the mounting structure.

30. The assembly of claim 29, each of the retaining members having an inner curved surface and the lens element having an outer curved surface, wherein the opposing-force pressure interference contact is curved between the inner curved surface of at least one of the retaining members and the outer curved surface of the lens element, and each of the retaining members having a side flat surface and each of the radially extending tabs having a side flat surface, wherein the opposing force interference contact is flat between the side flat surface of at least one of the retaining members and the side flat surface of at least one of the radially extending tabs.

31. The assembly of claim 30, each of the retaining members having a second side flat surface and each of the radially extending tabs having a second side flat surface, wherein the opposing force interference contact is flat between the second side surface of at least one of the retaining members and the second side surface of at least one of the radially extending tabs.

32. The assembly of claim 28, wherein the assembly further comprises means for fixing the lens element to the mounting structure permanently, and wherein the means for fixing the lens element to the mounting structure permanently comprises an adhesive bond of the lens element and the mounting structure.

33. The assembly of claim 32, wherein the adhesive bond is to at least one of the radially extending tabs of the lens element and at least one of the retaining members of the mounting structure.

34. The assembly of claim 28, wherein the assembly further comprises means for fixing the lens element to the mounting structure permanently, and wherein the means for fixing the lens element to the mounting structure permanently comprises a weld of the lens element and the mounting structure.

35. The assembly of claim 28, wherein the assembly further comprises means for fixing the lens element to the mounting structure permanently, and wherein the means for fixing the lens element to the mounting structure permanently comprises a heat induced seal of the lens element and the mounting structure.

* * * * *